United States Patent [19]
Bonaddio

[11] 4,027,562
[45] June 7, 1977

[54] FORCE APPLYING DEVICE FOR SCORING WHEELS

[75] Inventor: Robert M. Bonaddio, Monroeville, Pa.

[73] Assignee: PPG Industries, Inc., Pittsburgh, Pa.

[22] Filed: Mar. 23, 1976

[21] Appl. No.: 669,560

[52] U.S. Cl. .......................................... 83/8; 83/7; 83/12; 33/32 C
[51] Int. Cl.² ......................................... B26D 3/08
[58] Field of Search ......................... 83/6, 7, 8, 12; 33/32 C, 32 E, 32 D, 32 R

[56] References Cited
UNITED STATES PATENTS

| | | | |
|---|---|---|---|
| 1,167,254 | 1/1916 | Benson | 33/32 C |
| 3,280,677 | 10/1966 | Grzymislawski | 83/8 |
| 3,577,636 | 5/1971 | Deforre | 83/12 |

*Primary Examiner*—Donald R. Schran
*Attorney, Agent, or Firm*—Donald Carl Lepiane

[57] ABSTRACT

A device for applying a constant force to a glass scoring wheel includes a pivotally mounted L-shaped lever arm having the scoring wheel rotatably mounted at one end of the horizontal member and an adjustable vertical member. A constant force coil spring biases the vertical member to pivot the horizontal member in a direction to urge the scoring wheel at a constant predetermined force against the glass sheet. The constant predetermined force acting on the scoring wheel is a function of the height of the vertical arm.

23 Claims, 7 Drawing Figures

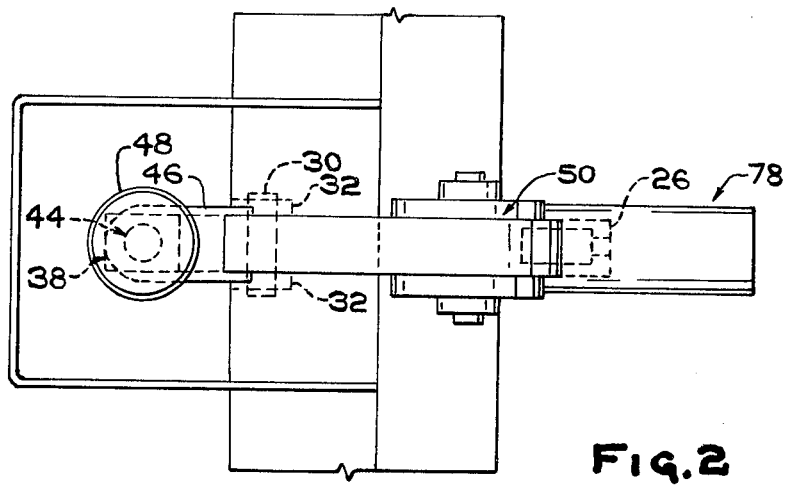
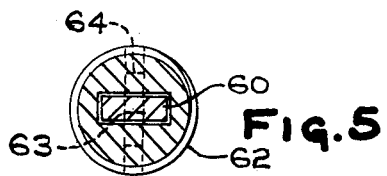
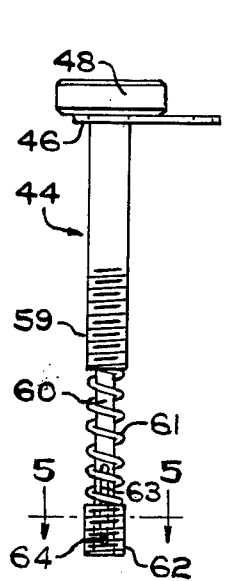
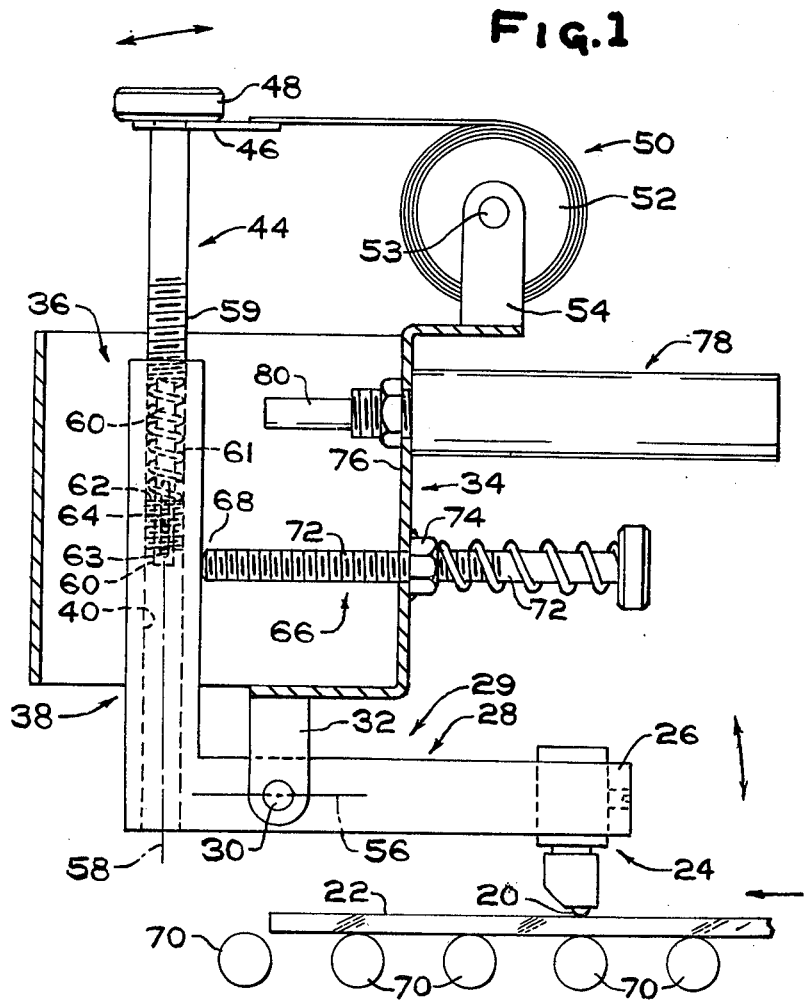

FORCE APPLYING DEVICE FOR SCORING WHEELS

BACKGROUND OF THE INVENTION

1. Field of the Invention:

This invention relates to a device for applying a constant force to a scoring wheel during the scoring of a glass sheet.

2. Discussion of the Prior Art and Technical Problems:

In the prior art there is taught the use of spiraled coiled springs for applying a force to a scoring wheel. Such teachings are found in U.S. Pat. Nos. 3,240,090; 3,280,676; 3,280,677; 3,577,636; 3,807,261 and 3,821,910 to name a few.

The drawback of spiraled coiled springs for applying a force to a scoring wheel is that the force of the spring is a function of the spring compression or extension.

For example, the spiraled coiled spring is adjusted to apply a predetermined force to a scoring wheel to score a glass sheet as it moves on conveyor rolls. Conveyor roll eccentricity and glass ribbon cross bow oscillates the scoring wheel relative to the conveyor rolls. In other words, the spiraled coiled spring expands to urge the scoring wheel toward the conveyor roll and is compressed by the scoring wheel moving away from the conveyor roll. The compression and extension of the spiraled coiled spring varies the force on the scoring wheel.

In the scoring of glass, in particular thin glass, variation in the force acting on the scoring wheel gives inconsistent scores. If the force acting on the scoring wheel is too high, e.g., above about 10 pounds (4.5 kilograms), the glass surface may be crushed at the score line and if the force acting on the scoring wheel is too low, e.g., below about 3 pounds (1.35 kilograms), the score is not sufficiently deep.

It would be advantageous therefore to have a device available to apply a constant force to a scoring wheel when the scoring wheel oscillates during scoring of a glass sheet or ribbon.

SUMMARY OF THE INVENTION

This invention relates to a device for applying a force to a tool facility, e.g., a scoring wheel. The device includes a lever arm facility having the scoring wheel mounted adjacent one end and pivotally mounted to move the scoring wheel through an oscillatory path toward and away from a piece of glass moving along a conveyor. Force applying facilities, e.g., a constant force coil spring is secured to the lever arm facilities to urge the scoring wheel toward the glass sheet. Facilities are also provided on the lever arm facility for dimensionally altering the lever arm facility to vary the resultant force on the scoring wheel.

This invention also relates to a method of changing the scoring force acting on a scoring facility, e.g., a scoring wheel for scoring a refractory material, e.g., a glass sheet or glass ribbon. The scoring wheel is mounted adjacent to an end of a pivotally mounted lever arm. The lever arm is dimensionally altered to change the force acting on the scoring wheel.

BRIEF DESCRIPTION OF THE DRAWINGS

FIG. 1 is an elevated side view of the force applying device of the invention applying a constant force to a scoring wheel to score a moving glass sheet;

FIG. 2 is a top view of the force applying device shown in FIG. 1;

FIG. 4 is an elevated side view of a locking pin used in the practice of the invention;

FIG. 5 is a view taken along lines 5—5 of FIG. 4;

DESCRIPTION OF THE INVENTION

Figure 6:
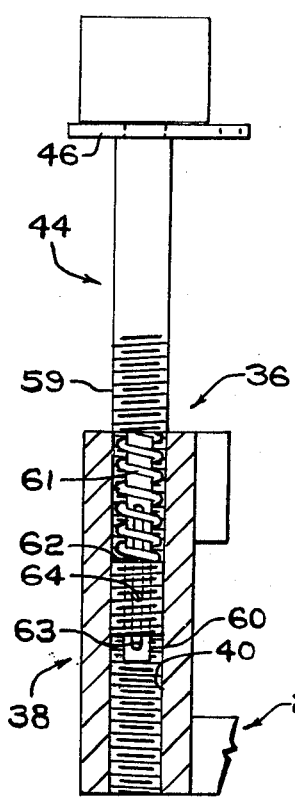
FIG. 6 is a cross sectional view of adjustable vertical member of the instant invention for setting the force acting on the scoring wheel.

This invention relates to a device for applying a constant force to a tool. In the discussion of the invention the tool is a scoring wheel for scoring a glass sheet or a glass ribbon. However, as will become apparent, the invention is not limited thereto. For example, the tool may be a wheel for cutting paper, or a device for marking defects on a glass sheet or glass ribbon. Further, the invention may be practiced on refractory material such as ceramics, e.g., Monofrax ceramics sold by the Carborundum Corporation, glass-ceramics, e.g, Hercuvit glass ceramics sold by PPG Industries, Inc.

With reference to FIGS. 1 and 2, a scoring wheel 20 of the type used in the art to score a glass sheet or glass ribbon 22 is rotatably mounted in a housing 24. The housing 24 is advantageously mounted adjacent to end 26 of an elongated horizontal member 28 of L-shaped lever arm 29. The elongated horizontal member 28 is pivotally mounted at 30 to a rigid bifurcated member 32 secured to a mounted housing 34 to freely move the scoring wheel 20 along an oscillatory path in a clockwise and counterclockwise direction as viewed in FIG. 1.

Adjustable vertical member 36 of the L-shaped lever arm 29 includes an elongated member 38 having a threaded passageway 40 for receiving a locking pin 44. A rotatably mounted collar 46 captured adjacent head 48 of the pin 44 as shown in FIG. 1 is connected to one end of a constant force apply spring 50.

The spring 50 is coiled on a hub 52 which hub 52 is rotatably mounted on a pin 53 secured in spaced members 54. The spaced members 54 are each secured to the housing 34.

The biasing action of the spring 50 moves the vertical member 36 in a clockwise direction to move the horizontal member 28 and the scoring wheel 20 in a clockwise direction toward the glass sheet 22 as viewed in FIG. 1.

The constant force applying spring 50 preferred in the practice of the invention is of the type that applys a constant force regardless of the extension of the spring. These types of springs are known as NEG'ATOR springs sold by Hunter Spring Division of Ametek.

Using a constant force applying spring, the force applied to the scoring wheel remains constant when the scoring wheel is moved toward and away from the glass sheet due to conveyor roll eccentricity, glass ribbon warpage or variations in glass thickness.

Figure 3:
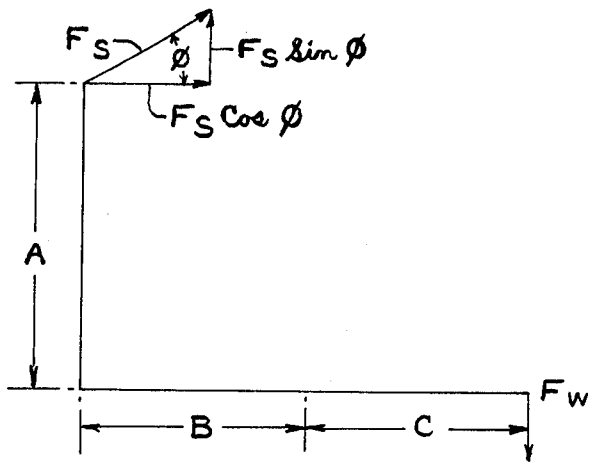
FIG. 3 is a force diagram of the force applying device of the invention.

With reference to FIG. 3, there is shown a force diagram of the device of the instant invention. The distance A is equal to the distance between the collar 46 and end 56 of the vertical member 38; the distance B is the length of the horizontal arm 28 between centerline 58 of the vertical member 38 and the center of the pivot point 30; and the distance C is the length of the horizontal arm 28 between the center of the pivot point 30 and rotating axis of the scoring wheel 20 as shown in FIG. 1. $F_s$ is the force of the spring 50 and $F_w$ is the force acting on the scoring wheel 20.

The rotating center axis of the spring 50 is considered at a fixed distance from the vertical member 36 and horizontal member 28 for simplicity of discussion.

The force acting on the scoring wheel 20 is given by the following equation:

$$F_w = F_s \frac{[\sin \phi \, (B) + \cos \phi \, (A)]}{C}$$

where $F_w$, $F_s$, A, B, and C are as previously defined and $\phi$ is the angle subtended by extension of the spring 50 and the collar 40 of the locking pin 44.

From the Equation, it can be seen that the force acting on the scoring wheel is varied by varying A, B, C or $\phi$. As can be appreciated the angle varies as a function of the distance A because the spring is secured at a fixed position on the vertical member 36. The force of the spring 50 remains constant. For a given spring and adjustable lever arm, the force $F_w$ in the Equation has a predetermined range. This range can be changed by selecting a spring 50 having a different biasing force and/or dimensionally changing the adjustable lever arm.

In the practice of the instant invention, it is recommended to maintain the distances B and C constant and vary the length of the vertical member 36, i.e., distance A shown in FIG. 3. With this arrangement, changes can be made while the scoring wheel 20 is in contact with the glass sheet and the design is simplified.

With reference to FIG. 1, the length of the vertical member 36 may be increased or decreased by threading the pin 44 into and out of the threaded passageway 40, respectively of the member 38.

As can be appreciated, the invention is not limited to the arrangement of elements to vary the length of the vertical arm and the use of the locking pin 44 is presented for illustration purposes only.

With reference to FIGS. 4, 5 and 6 the locking pin 44 has a threaded shaft portion 59 and a stem 60. A spiral coiled spring 61 is captured on the stem 60 between the end threaded shaft portion 59 and an outward threaded sleeve 62. The sleeve 62 is slideably mounted on the stem 60 to compress the spring 61 in any conventional manner. For example, the stem 60 is provided with a groove 63 for receiving pin 64 having its end captured in the sleeve 62.

The sleeve 62 is threaded into the passageway 40 of the vertical member 30 a predetermined distance and thereafter the stem 60 is urged into the passageway 40 of the member 38 to slide the pin 64 in the groove 63 to compress the spring 61. The threaded shaft portion is threaded into the passageway 40 of the member 38. The compressive force of the spring 61 prevents the locking pin 44 from vibrating loose.

Referring now to FIGS. 1 and 2, a stop member 66 is mounted through a wall of the housing 34 in any conventional manner and has end 68 engaging the vertical member 38 to limit clockwise movement of the scoring wheel 20 toward the glass sheet 22 supported on conveyor rolls 70. The stop member 66 also maintains the scoring wheel 20 a predetermined distance above the conveyor rolls 70 so that the scoring wheel rides over the leading edge of the advancing glass sheet 22 to score same.

In general, the stop member 66 includes a threaded shaft 72 threaded through nut 74 secured to wall 76 of the housing 34 with its end 68 engaging vertical member 40. Rotating the shaft 72 in a first direction moves the end 68 against the vertical arm 38 to move the scoring wheel in a counterclockwise direction away from the glass sheet and rotating the shaft 72 in a second direction opposite to the first direction moves the scoring wheel 20 in a clockwise direction toward the glass sheet 22 as viewed in FIG. 1.

An air cylinder 78 is mounted in the wall 76 of the housing 34 with its shaft 80 spaced from the vertical member 38 for moving the scoring wheel into a non-scoring position above the conveyor 70. In general, the shaft 80 is moved out of the cylinder 78 into engagement with the vertical members 38 to pivot the scoring wheel 20 about pivot point 30 in a counterclockwise direction as viewed in FIG. 1.

Figure 7:
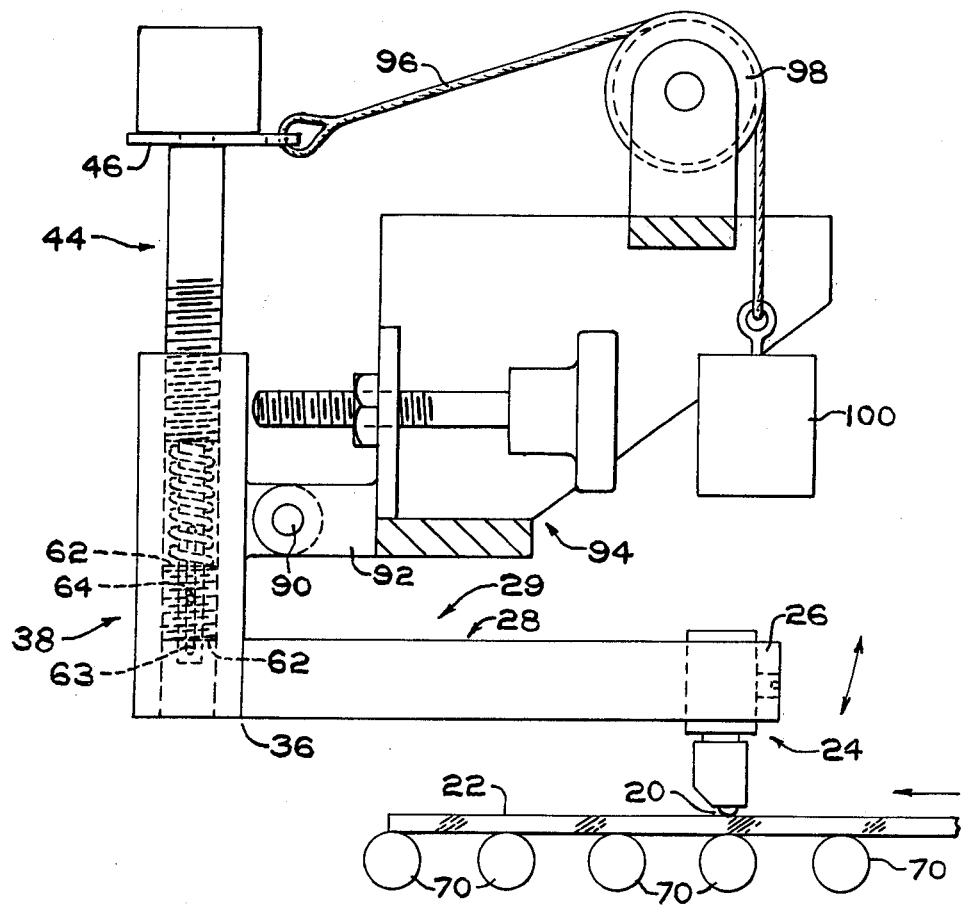
FIG. 7 is an alternate embodiment of the invention.

As can now be appreciated, modifications to the invention may be made without deviating from the scope. For example, and with reference to FIG. 7, there is shown the L-shaped lever arm 29 having the scoring wheel 20 adjacent end 26 of the horizontal member 28.

The vertical arm 38 is pivotally mounted at 90 to a member 92 secured to stationary block member 94.

A cable 96 having one end attached to the collar 46 on the locking pin 44, passes over pulley 98 and has a weight 100 attached to the other end of the cable 96.

The weight 100 exerts a constant force on the locking pin 44 to pivot the scoring wheel toward the conveyor 70 or glass sheet 22.

DETAILED DESCRIPTION OF THE INVENTION

With reference to FIGS. 1 and 2, the invention will be described to score a glass sheet 22 having a thickness of about 0.12 inch (3 millimeters) moving from right to left on conveyor rolls 70 as shown in FIG. 1.

A scoring wheel 20 is rotatably mounted in a housing 24 secured adjacent end 26 of elongated horizontal member 28 of L-shaped lever arm 29. The member 28 is pivotally mounted at 30 with the center of the pivot point 30 and the rotating center of the scoring wheel are about 2.583 inches (6.85 centimeters) apart. Horizontal member 28 of the lever arm 29 has its axial center 58 spaced about 1 inch (2.54 centimeters) from the center of pivot point 30.

A locking pin 44 is threaded into passageway 40 of the vertical member 38 to vary the height of the vertical member 36. With reference to FIGS. 4, 5, and 6, the locking pin 44 includes a threaded shaft portion 59 and a stem 60. A spring 61 is captured on the stem 60 and compressed by an outwardly threaded sleeve 62 slideably mounted on the stem 60 in the following manner. The stem 60 is provided with a groove 63 for slideably receiving a pin 64 having its ends secured in the sleeve 62.

The sleeve 62 is threaded into the passageway 40 of the vertical member 38 and thereafter the pin 44 is urged into the passageway to slide the pin 64 in the groove 63 to compress the spring 61. The threaded portion 59 is then threaded into the passageway 40 to thread the sleeve 62 and threaded portion 59 into the passageway 40. The compressed spring 61 prevents the locking pin from vibrating loose during scoring of the glass sheet 22.

The height from washer 46 captured adjacent head 48 of the locking pin 44 to a horizontal arm 56 through the center of the pivot point 30 of the locking pin is about 5½ inches (13.97 centimeters).

A Neg'tor spring 50 sold by Hunter Spring Division of Ametek Catalog No. SH8G28 having a biasing force of 2.63 pounds (1.4 kilograms) has one end secured to the collar 46. The spring 50 is coiled on a hub 52. The hub 52 is rotatably mounted on a pin 53 secured at its ends to bifurcated member 54. The distance from the longitudinal axis 58 of the pin 44 to the center of the hub is about 3¼ inches (8.25 centimeters). With the above arrangement, the extension of the spring 50 is normal to the longitudinal axis of the pin. The angle $\phi$ is zero and $\sin \phi$ is zero in the force diagram shown in FIG. 3.

From the Equation the force $F_w$ acting on the scoring wheel is calculated to be about 5.6 pounds (2.5 kilograms).

Threaded shaft 72 of stop member 66 is threaded through nut 74 mounted on the wall 76 of the housing 34 to move end 68 of the shaft 72 against the vertical member 30 to limit clockwise motion of the scoring wheel toward conveyor 70 as shown in FIG. 1.

The member 66 is adjusted so that the scoring wheel is slightly less than about 0.12 inch (0.31 centimeter) above the surface of the conveyor rolls 70 to score the glass ribbon 22.

As the glass ribbon 22 is advanced by the conveyor rolls 70 toward the scoring wheel, the scoring wheel 20 rides over the leading edge of the glass ribbon. The glass ribbon as it advances under the scoring wheel is scored.

When the scoring wheel is moved away or toward the conveyor rolls due to conveyor roll eccentricity or ribbon warpage roll out, the force of the scoring wheel remains constant because the Neg'tor spring 50 has a constant biasing force regardless of the extended length of the spring.

An air cylinder 78 is mounted through the wall 76 of the housing 34 and has its shaft 80 spaced from the vertical arm 38. The scoring wheel is moved into a non-scoring position by moving the cylinder shaft 80 against the vertical member 40 to move the scoring wheel in a counterclockwise direction as viewed in FIG. 1 away from the conveyor rolls 70.

If the force acting on the scoring wheel is to be reduced or increased, the locking pin 44 is threaded into or out of the passageway 40 of the vertical member. For example, if the force acting on the scoring wheel is to be reduced from about 5.6 pounds (2.5 kilograms) to about 3.568 pounds (1.6 kilograms), the lock pin 44 is threaded into the passageway 40 about 2 inches (5.08 centimeters) reducing the length of vertical member, i.e., the length of A as shown in FIG. 3 is reduced to 3½ inches (8.89 centimeters).

As can be appreciated, the above example was presented for illustration purposes and is not limited to the invention.

I claim:

1. A device for applying a force to a tool means comprising:
    lever arm means having an end;
    means for mounting the tool means adjacent an end of said lever arm means;
    means for pivotally mounting said lever arm means to move the tool means through an oscillatory path;
    force applying means secured to said lever arm means to bias the tool means in a first direction along the oscillatory path; and
    means mounting said lever arm means for dimensionally altering said lever arm means to apply a predetermined resultant force on the tool means.

2. The device as set forth in claim 1 wherein said force applying means is a constant force applying means.

3. The device as set forth in claim 1 wherein said lever arm means includes:
    an elongated member having a first end and a second end, the tool means mounted adjacent the first end and said constant force applying means acting adjacent the second end;
    said pivotally mounting means mounting said member between the first end and second end; and
    said dimensionally altering means including means for increasing or decreasing the distance between the tool means and said pivotally mounting means.

4. The device as set forth in claim 1 wherein said lever arm means includes:
    an elongated member having a first end and a second end, the tool means mounted adjacent the first end and said constant force applying means secured at a position adjacent the second end;
    said pivotally mounting means mounting said member between the first and second end; and
    said dimensionally altering means including means for increasing or decreasing the distance between the secured position of said constant force applying means and said pivotally mounting means.

5. The device as set forth in claim 1 wherein said lever arm means includes:
    an elongated horizontal member having a first end and a second end, the tool means mounted adjacent the first end;
    an elongated vertical member secured adjacent the second end of said horizontal member;
    said pivotally mounting means mounting said horizontal member between the first end and the second end;
    said constant force applying means secured to said vertical member; and
    said dimensionally altering means including means for increasing or decreasing the height of said vertical member.

6. The device as set forth in claim 1 wherein said lever arm means includes:
    an elongated horizontal member having a first end and a second end, the tool means mounted adjacent the first end;
    an elongated vertical member secured at one end adjacent the second end of said horizontal member and said constant force applying means secured to the other end of said elongated vertical member;
    said pivotally mounting means mounted between the ends of said vertical member and including means for increasing or decreasing the length of said vertical member between said constant force applying means and said pivot means.

7. The device as set forth in claim 1 wherein the tool means is a scoring wheel.

8. The device as set forth in claim 1 wherein the tool means is a cutting wheel.

9. The device as set forth in claim 1 wherein the tool means is a marking device.

10. The device as set forth in claim 1 wherein said constant force applying means is a spring.

11. The device as set forth in claim 1 wherein said constant force applying means includes a weight and pulley.

12. The device as set forth in claim 1 wherein said dimensionally altering means includes:
a housing having a threaded hole therethrough;
a shaft having an upper threaded portion and a lower stem portion;
a spring mounted on the stem portion; and
collar means having outward threads mounted on the stem portion for compressing the spring on the stem.

13. In an apparatus for scoring a refractory material of the type having scoring means; means for displacing the refractory material and scoring means relative to one another, the improvement comprising:
lever arm means having a first end and a second end;
means for mounting the scoring means adjacent the first end of said lever arm means;
means for pivotally mounting said lever arm means between the first and second end to move the scoring means toward and away from the conveyor means;
constant force applying means secured to said lever arm means adjacent the second end to bias the scoring means toward the conveyor means; and
means mounting said lever arm means for dimensionally altering said lever arm means to apply a predetermined constant force on the scoring means.

14. The improved scoring apparatus as set forth in claim 13 wherein said constant force applying means is a spring.

15. The improved scoring apparatus as set forth in claim 13 wherein said constant force applying means is a weight and pulley.

16. The improved scoring apparatus as set forth in claim 13 wherein said lever arm means includes:
an elongated member having a first end and a second end, the scoring means mounted adjacent the first end and said constant force applying means acting adjacent the second end;
said pivotally mounting means mounting said member between the first end and second end; and
said dimensionally altering means including means for increasing or decreasing the distance between the scoring means and said pivotally mounting means.

17. The improved scoring apparatus as set forth in claim 13 wherein said lever arm means includes:
an elongated member having a first end and a second end, the scoring means mounted adjacent the first end and said constant force applying means secured at a position adjacent the second end;
said pivotally mounting means mounting said member between the first and second end; and
said dimensionally altering means including means for increasing or decreasing the distance between the secured position of said constant force applying means and said pivotally mounting means.

18. The improved scoring apparatus as set forth in claim 13 wherein said lever arm means includes:
an elongated horizontal member having a first end and a second end, the scoring means mounted adjacent the first end;
an elongated vertical member secured adjacent the second end of said horizontal member;
said pivotally mounting means mounting said horizontal member between the first end and the second end;
said constant force applying means secured to said vertical member; and
said dimensionally altering means including means for increasing or decreasing the height of said vertical member.

19. The improved scoring apparatus as set forth in claim 1 wherein said lever arm means includes:
an elongated horizontal member having a first end and a second end, the scoring means mounted adjacent the first end;
an elongated vertical member secured at one end to adjacent the second end of said horizontal member and said constant force applying means secured to the other end of said elongated vertical member;
said pivotally mounting means mounted between the ends of said vertical member and including means for increasing or decreasing the length of said vertical member between said constant force applying means and said pivot means.

20. The improved scoring apparatus as set forth in claim 13 wherein said dimensionally allering means includes:
a housing having a threaded hole therein;
a shaft having an upper threaded portion and a lower stem portion;
a spring mounted on the stem portion; and collar means having outward threads slideably mounted on the stem portion for compressing the spring on the stem.

21. The improved scoring apparatus as set forth in claim 18 wherein the refractory material is glass.

22. The improved scoring apparatus as set forth in claim 21 further including:
stop means engaging said lever arm means to maintain the scoring means in predetermined spaced relation to the conveyor; and
biasing means acting on said lever arm means to bias said scoring means away from the conveyor against the biasing action of said constant force applying means to move said scoring means into a non-scoring position.

23. The improved scoring apparatus as set forth in claim 22 wherein said elongated vertical member includes:
a housing having a threaded hole therein;
a shaft having an upper threaded portion and a lower stem portion;
a spring mounted on the stem portion;
collar means having outward threads slideably mounted on the stem portion for compressing the spring on the stem;
means for connecting an end of a constant force coil spring to the upper threaded portion of said shaft; and
said step means and said biasing means acting on said housing.

* * * * *